(12) United States Patent
Brandenburg et al.

(10) Patent No.: US 6,642,346 B2
(45) Date of Patent: Nov. 4, 2003

(54) COATING COMPOSITIONS CONTAINING SUBSTITUTED AND UNSUBSTITUTED EXOMETHYLENE LACTONE OR LACTAM MONOMERS

(75) Inventors: Charles J. Brandenburg, Wilmington, DE (US); Randal D. King, Kennett Square, PA (US); Larry G. Oien, Lapeer, MI (US); Peter W. Uhlianuk, Romeo, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/770,073

(22) Filed: Jan. 25, 2001

(65) Prior Publication Data

US 2002/0010312 A1 Jan. 24, 2002

Related U.S. Application Data

(60) Provisional application No. 60/185,594, filed on Feb. 28, 2000.

(51) Int. Cl.[7] .................. C08G 73/00; C08G 63/08; C08F 224/00; C08F 226/00
(52) U.S. Cl. .................. 528/310; 528/354; 528/318; 528/323; 528/359; 526/266; 525/410; 525/411; 525/413; 525/415
(58) Field of Search .................. 528/354, 310, 528/318, 323, 359; 526/266; 525/410, 411, 413, 415

(56) References Cited

U.S. PATENT DOCUMENTS

| | | | |
|---|---|---|---|
| 3,639,147 A | 2/1972 | Benefiel et al. | |
| 4,728,543 A | 3/1988 | Kurauchi et al. | |
| 4,943,614 A | * 7/1990 | Miyazaki et al. | ............ 525/117 |
| 5,166,357 A | 11/1992 | Orlek et al. | |
| 5,244,696 A | 9/1993 | Hazan et al. | |
| 5,880,235 A | 3/1999 | Schwind et al. | ............ 526/868 |

FOREIGN PATENT DOCUMENTS

| | | |
|---|---|---|
| JP | 10120672 | 5/1998 |
| JP | 11279232 | 10/1999 |
| WO | WO 00/35960 A2 | 6/2000 |

OTHER PUBLICATIONS

Murray et al., Convenient Synthesis of α–Epoxylactones (4–oxo–1,5–dioxaspire[2,4]heptanes and [2,5]Octanes), Synthesis, 1995, 35–38.

Martin et al., A New Method for the Synthesis of 960 – Methylenebutyrolactones, Chemical Communications, 1970, 27.

Mitsuru Ueda et al., Radical–Initiated Homo– and Copolymerization of α–Methylene–γ–Butytolactone, Journal of Polymer Science: Polymer Chemistry Edition, vol. 20, 00. 2819–2828.

Copy of International Searche Report dated 221/2001.

* cited by examiner

Primary Examiner—P. Hampton-Hightower
(74) Attorney, Agent, or Firm—Steven C. Benjamin

(57) ABSTRACT

This invention is directed to a coating composition used for original equipment manufacturing or refinishing uses in the automotive industry, which coating composition utilizes an acrylic polymer which contains substituted or unsubstituted exomethylene lactones or lactams as a comonomer.

29 Claims, No Drawings

COATING COMPOSITIONS CONTAINING SUBSTITUTED AND UNSUBSTITUTED EXOMETHYLENE LACTONE OR LACTAM MONOMERS

FIELD OF THE INVENTION

This invention is directed to a coating composition and in particular to a clear coating composition used for original equipment manufacturing (OEM) or refinishing uses in the automotive industry, which coating composition utilizes an acrylic polymer which contains one or more substituted or unsubstituted exomethylene lactones or lactams as a comonomer.

TECHNICAL BACKGROUND OF THE INVENTION

It is well known that consumers prefer automobiles and trucks with an exterior finish having an attractive aesthetic appearance, including high gloss and excellent DOI (distinctness of image). While ever more aesthetically attractive finishes have been obtained, deterioration of the finish over time, whereby the exterior finish of an automobile or truck loses its luster or other aspects of its aesthetic appearance, may be all the more noticeable. In order to protect and preserve the aesthetic qualities of the finish on a vehicle, it is common to provide a clear (unpigmented) clear coat over a colored (pigmented) basecoat, so that the basecoat remains unaffected even on prolonged exposure to the environment or weathering.

Clear coat/color coat finishes for automobiles and trucks have been used in recent years and are very popular. Kurauchi et al. U.S. Pat. No. 4,728,543 issued Mar. 1, 1988, and Benefiel et al. U.S. Pat. No. 3,639,147 issued Feb. 1, 1972, show the application of a clear coat to a color coat or basecoat in a "wet on wet" application, i.e., the clear coat is applied before the color coat is completely cured.

Although application of the clearcoat finish is effective in reducing finish marring, it is expensive and a means to increase the mar resistance of the finish as well as reduce the cost of application would be desirable. In one instance the introduction of alkoxysilane compounds into the coating composition has been effective in increasing the finish resistance to chemical and environmental weathering (U.S. Pat. No. 5,244,696). U.S. Pat. No. 5,286,782 discloses coating compositions used as a clearcoat in an automotive finish having increased mar resistance comprising a) an acrylic polymer derived from styrene, two methacrylate polymers and a hydroxy alkyl (meth)acrylate; b) a polyol component and c) an organic polyisocyanate. The first methacrylate in a) is methyl methacrylate, isobornyl methacrylate or cyclohexyl methacrylate; the second methacrylate is n-butyl methacrylate, isobutyl methacrylate or ethyl hexyl methacrylate. JP 11279232 teaches the use of 1-(γ-Butyrolacton-2-yl)ethyl (meth)acrylate copolymers in coatings to enhance coating adhesion to a metal surface.

Although the above cited compositions provide effective mar resistance, better resistance is still an issue and cost of application continues to remain a barrier. The problem to be solved therefore is to develop a coating composition having high mar and scratch resistance while reducing the cost of application. Applicants have solved the stated problem by the discovery that the introduction of a substituted or unsubstituted exomethylene lactone or lactam as a comonomer in a coatings composition imparts enhanced mar and scratch resistance to the finish. Additionally where the exomethylene lactone or lactam is substituted, either in whole or in part for other monomers in the composition, cost may be reduced.

SUMMARY OF THE INVENTION

The present invention provides a coating composition comprising:

(a) a polymer containing at least one exomethylene lactone or lactam monomer of the structure:

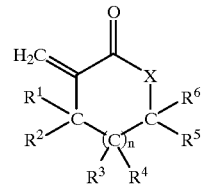

where X=O or N—$R^7$, n=0, 1 or 2 and $R^1$, $R^2$, $R^3$, $R^4$, $R^5$, $R^6$, $R^7$ are independently selected from the group (I) consisting of H, —CH(O), —CN and halogen, and from the group (II) consisting of —C(O)$OR^9$, —C(O)$NR^{10}R^{11}$, —$CR^{12}$(O), —C(O)OC(O)$R^{13}$, —C(O)$NR^{14}COR^{15}$, —OC(O)$R^{16}$, —$OR^{17}$, —$NR^{18}R^{19}$ alkyl, substituted alkyl, aryl and substituted aryl; wherein when $R^1$, $R^2$, $R^3$, $R^4$, $R^5$, $R^6$, $R^7$ are selected from group (II), they may optionally form a cyclic structure with one another; $R^9$, $R^{10}$, $R^{11}$, $R^{12}$, $R^{13}$, $R^{14}$, $R^{15}$, $R^{16}$, $R^{18}$ and $R^{19}$ are H, alkyl, aryl, substituted alkyl or substituted aryl; $R^{17}$ is alkyl, aryl, substituted alkyl or substituted aryl; and wherein the alkyl and substituted alkyl are $C_1$–$C_{12}$; and (b) at least one other copolymerizable monomer.

In one embodiment the invention provides that the at least one exomethylene lactone or lactam monomer is an α-methylene-γ-butyrolactone monomer of the structure:

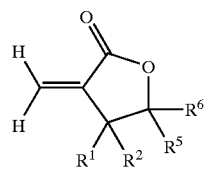

wherein $R^1$, $R^2$, $R^5$ and $R^6$ are each independently selected from the group (I) consisting of H, —CH(O), —CN and halogen, and from the group (II) consisting of —C(O)$OR^9$, —C(O)$NR^{10}R^{11}$, —$CR^{12}$(O), —C(O)OC(O)$R^{13}$, —C(O)$NR^{14}COR^{15}$, —OC(O)$R^{16}$, —$OR^{17}$, —$NR^{18}R^{19}$ alkyl, substituted alkyl, aryl and substituted aryl; wherein when $R^1$ and $R^2$ are selected from group (II), $R^1$ and $R^2$ may optionally form a cyclic structure; $R^9$, $R^{10}$, $R^{11}$, $R^{12}$, $R^{13}$, $R^{14}$, $R^{15}$, $R^{16}$, $R^{18}$ and $R^{19}$ are H, alkyl, aryl, substituted alkyl or substituted aryl; $R^{17}$ is alkyl, aryl, substituted alkyl or substituted aryl; and wherein the alkyl and substituted alkyl are $C_1$–$C_{12}$, and that the copolymerizable monomer of step (b) is a methacrylate monomer.

The invention additionally provides an acrylic polymer comprising:

(a) substituted or unsubstituted exomethylene lactone or lactam monomer;

(b) a first methacrylate monomer;

(c) a second methacrylate monomer; and (d) a hydroxy alkyl methacrylate or acrylate monomer having 1–4 carbon atoms in the alkyl group.

Optionally the acrylic polymer may comprise polymerized monomers of styrene.

The invention further provides a coating composition having a film forming binder solids content of about 30–70% by weight and an organic liquid carrier, wherein the binder contains about:

(a) 50–80% by weight, based on the weight of the binder, of an acrylic polymer comprising:
   (i) at least one exomethylene lactone or lactam monomer of the structure:

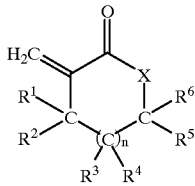

where X=O or N—$R^7$, n=0, 1 or 2 and $R^1$, $R^2$, $R^3$, $R^4$, $R^5$, $R^6$, $R^7$ are independently selected from the group (I) consisting of H, —CH(O), —CN and halogen, and from the group (II) consisting of —C(O)O$R^9$, —C(O)N$R^{10}$O$R^{11}$, —C$R^{12}$(O), —C(O)OC(O)$R^{13}$, —C(O)N$R^{14}$CO$R^{15}$, —OC(O)$R^{16}$, —O$R^{17}$, —N$R^{18}R^{19}$ alkyl, substituted alkyl, aryl and substituted aryl; wherein when $R^1$, $R^2$, $R^3$, $R^4$, $R^5$, $R^6$, $R^7$ are selected from group (II), they may optionally form a cyclic structure with one another; $R^9$, $R^{10}$, $R^{11}$, $R^{12}$, $R^{13}$, $R^{14}$, $R^{15}$, $R^{16}$, $R^{18}$ and $R^{19}$ are H, alkyl, aryl, substituted alkyl or substituted aryl; $R^{17}$ is alkyl, aryl, substituted alkyl or substituted aryl; and wherein the alkyl and substituted alkyl are $C_1$–$C_{12}$;

(ii) at least one methacrylate monomer selected from the group consisting of methyl methacrylate, isobornyl methacrylate, cyclohexyl methacrylate, n-butyl methacrylate, isobutyl methacrylate, ethyl hexyl methacrylate and mixtures thereof; and (iii) at least one hydroxy alkylmethacrylate or acrylate monomer each having 1–4 carbon atoms in the alkyl group wherein the polymer has a number average molecular weight of about 1,000–100,000 determined by gel permeation chromotography; and (b) 1–20% by weight, based on the weight of the binder, of a polyol component; and (c) 10–49% by weight, based on the weight of the binder, of a crosslinking agent selected from the group consisting of an organic polyisocyanate, a melamine formaldehyde resin, and a silane or mixtures thereof.

DETAILED DESCRIPTION OF THE INVENTION

The present invention provides coating compositions containing acrylic polymers having at least one exomethylene lactone or lactam monomer for, eample an α-methylene-γ-butyrolactone monomer. The inclusion of the lactone, lactam or α-methylene-γ-butyrolactone monomer results in increased hardness of the coating; improved the scratch resistance; improved mar resistance; and, potentially, increased cure rate, and improved weatherability of the coating composition. In a preferred embodiment the lactone, lactam or α-methylene-γ-butyrolactone monomer may be used to replace all or a portion of other monomers in the composition. In particular substitution of the lactone, lactam or α-methylene-γ-butyrolactone monomer for a styrene or methacrylate monomer is particularly useful.

In this disclosure, a number of terms and abbreviations are used. The following definitions are provided.

"Original equipment manufacture" is abbreviated "OEM".

"α-methylene-γ-butyrolactone" is abbreviated "MBL".

"Polymer dispersion index" is abbreviated "PDI" and is defined as the ratio of weight average molecular weight "$M_w$" to number average molecular weight "$M_n$".

"Glass transition temperature" is abbreviated Tg.

The invention pertains to a coating composition comprising at least one exomethylene lactone or lactam monomer of the structure:

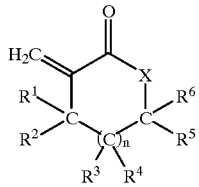

where X=O or N—$R^7$, n=0, 1 or 2 and $R^1$, $R^2$, $R^3$, $R^4$, $R^5$, $R^6$, $R^7$ are independently selected from the group (I) consisting of H, —CH(O), —CN and halogen, and from the group (II) consisting of —C(O)O$R^9$, —C(O)N$R^{10}R^{11}$, —C$R^{12}$(O), —C(O)OC(O)$R^{13}$, —C(O)N$R^{14}$CO$R^{15}$, —OC(O)$R^{16}$, —O$R^{17}$, —N$R^{18}R^{19}$ alkyl, substituted alkyl, aryl and substituted aryl; wherein when $R^1$, $R^2$, $R^3$, $R^4$, $R^5$, $R^6$, $R^7$ are selected from group (II), they may optionally form a cyclic structure with one another; $R^9$, $R^{10}$, $R^{11}$, $R^{12}$, $R^{13}$, $R^{14}$, $R^{15}$, $R^{16}$, $R^{18}$ and $R^{19}$ are H, alkyl, aryl, substituted alkyl or substituted aryl; $R^{17}$ is alkyl, aryl, substituted alkyl or substituted aryl; and wherein the alkyl and substituted alkyl are $C_1$–$C_{12}$; and (b) at least one other copolymerizable monomer.

In a preferred embodiment the invention provides that the at least one exomethylene lactone or lactam monomer is an α-methylene-γ-butyrolactone monomer of the structure:

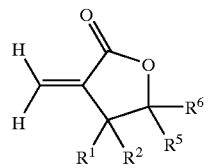

wherein $R^1$, $R^2$, $R^5$ and $R^6$ are each independently selected from the group (I) consisting of H, —CH(O), —CN and halogen, and from the group (II) consisting of —C(O)O$R^9$, —C(O)N$R^{10}R^{11}$, —C$R^{12}$(O), —C(O)OC(O)$R^{13}$, —C(O)N$R^{14}$CO$R^{15}$, —OC(O)$R^{16}$, —O$R^{17}$, —N$R^{18}R^{19}$ alkyl, substituted alkyl, aryl and substituted aryl; wherein when $R^1$ and $R^2$ are selected from group (II), $R^1$ and $R^2$ may optionally form a cyclic structure; $R^9$, $R^{10}$, $R^{11}$, $R^{12}$, $R^{13}$, $R^{14}$, $R^{15}$, $R^{16}$, $R^{18}$ and $R^{19}$ are H, alkyl, aryl, substituted alkyl or substituted aryl; $R^{17}$ is alkyl, aryl, substituted alkyl or substituted aryl; and wherein the alkyl and substituted alkyl are $C_1$–$C_{12}$, and at least one other copolymerizable monomer.

A preferred α-methylene-γ-butyrolactone of the above structure has $R^1$, $R^2$, $R^5$ and $R^6$ equal to hydrogen. This yields the unsubstituted α-methylene-γ-butyrolactone (MBL). MBL is commercially available and methods of synthesis are well known in the art (see for example (Martin et al., *J Chem. Soc.* D 1:27 (1970)); Murray et al. *Synthesis* 1:35–38 (1985); U.S. Pat. No. 5,166,357; and JP 10120672).

The α-methylene-γ-butyrolactones are cyclic acrylates which can be polymerized (See reaction I, illustrated for MBL) by free radical, anionic, or group transfer polymerization methods. Coatings comprising α-methylene-γ-butyrolactones as monomers in the formulation exhibit improved performance with respect to: increased glass transition temperature of the resin; increased hardness of the coating; improved the scratch resistance; improved mar resistance; and, potentially, increased cure rate, and improved weatherability.

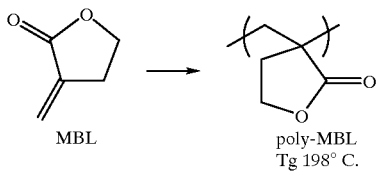

MBL → poly-MBL Tg 198° C.

Reaction I

The majority of commercial original equipment manufacture (OEM) and refinish clear coats applied are based on acrylic copolymers. The acrylics having differing reactive functional groups are co cured with a variety of curing agents such as polyisocyanate, melamine, polyamines, or polyacids. The acrylics generally use styrene as a low cost "hard" monomer to increase film $T_g$ and thus gain improvements in scratch and mar resistance. The level of styrene that is usable is restricted due to its adverse effects on durability. It is known that use of aromatic ring structures in clear coats often leads to defects upon exposure such as film yellowing, gloss loss, and the like.

The use of alternative monomers which do not possess aromatic ring structures but are capable of providing increased $T_g$ in acrylic copolymers has recently been tested. Aliphatic ring containing acrylates and methacrylates are known which increase $T_g$. These include isobornyl acrylate and methacrylate ($T_g$ 94° C. and 111° C. respectively) and cyclohexyl acrylate and methacrylate ($T_g$ 10° C. and 83° C. respectively) for example. All of these monomers contain pendant ring groups attached to the acrylic backbone by only one carbon to carbon single bond. Their use at very high levels does improve mar resistance to some extent.

The copolymers of the present invention contain exomethylene lactone, lactam or butyrolactone ring structures which are attached to the acrylic backbone by two carbon to carbon bonds. This unusual attachment increases overall copolymer $T_g$ significantly more than known aliphatic ring-containing monomers such as those described above. Unexpectedly it was found that mar resistance and film $T_g$ were higher than that of styrene when used at the same levels.

The invention concerns in one embodiment a coating composition comprising a polymer containing at least one alpha-methylene-gamma-butyrolactone monomer and at least one other copolymerizable monomer.

In this embodiment, the copolymerizable monomer is selected from the group consisting of methyl methacrylate, isobornyl methacrylate, cyclohexyl methacrylate, n-butyl methacrylate, isobutyl methacrylate, ethyl hexyl methacrylate and mixtures thereof. It was found that in the compositions of the present invention when an exomethylene lactone, lactam or butyrolactone compound was used as a substitute for a portion of the methacrylate monomer, that the resulting coating was no less scratch or mar resistant. This finding represents a commercial advantage as there is a cost savings in the replacement of the methacrylates, particularly where isobornyl methacrylate is concerned.

In one embodiment the invention relates to an acrylic polymer as part of a coating composition. A typical automobile steel panel or substrate has several layers of coatings. The substrate is typically first coated with an inorganic rust-proofing zinc or iron phosphate layer over which is provided a primer which can be an electrocoated primer or a repair primer. A typical electrocoated primer comprises an epoxy polyester and various epoxy resins. A typical repair primer comprises an alkyd resin. Optionally, a primer surfacer can be applied over the primer coating to provide for better appearance and/or improved adhesion of the basecoat to the primer coat. A pigmented basecoat or colorcoat is next applied over the primer surfacer. A typical basecoat comprises a pigment, which may include metallic flakes in the case of a metallic finish, and polyester or acrylourethane as a film-forming binder. A clearcoat is then applied to the pigmented basecoat (colorcoat).

In the application of the coating composition as a clear coating to a vehicle such as an automobile or a truck, the basecoat which may be either a solvent based composition or a waterborne composition is first applied and then dried to at least remove solvent or water before the clear coating is applied usually by conventional spraying. Electrostatic spraying also may be used. The dry film thickness of the clear coating is about 0.5–5 mils. The clear coating is dried at ambient temperatures generally in less than 5 minutes to a tack and dust free state. Moderately higher temperatures up to about 40° C. also can be used. As soon as the clear coating is sufficiently cured to be dust free and tack free the vehicle can be moved from the work area to allow for the refinishing of another vehicle.

A coating composition according to the present invention, depending on the presence of pigments or other conventional components, may be used as a basecoat, clearcoat, or primer. However, a particularly preferred composition is useful as a clearcoat to prevent weathering and scratching the entire finish. A clearcoat composition of the present invention may be applied over a basecoat composition of the present invention. Optionally the composition may be used in refinish applications.

The film-forming portion of the present coating composition, comprising polymeric components, is referred to as the "binder" or "binder solids" and is dissolved, emulsified or otherwise dispersed in an organic solvent or liquid carrier. The binder solids generally include all the normally solid polymeric non-liquid components of the composition. Generally, catalysts, pigments, and chemical additives such as stabilizers are not considered part of the binder solids. Non-binder solids other than pigments typically do not amount to more than about 5% by weight of the composition. In this disclosure, the term binder includes the acrylic polymer, a polyol component and a crosslinking agent such as organic polyisocyanate, a melamine or a silane compound. The coating composition suitably contains about 30–70% by weight of the binder and about 25–50% by weight of the organic solvent carrier.

The invention therefor provides a coating composition having a film forming binder solids content of about 30–70% by weight and an organic liquid carrier, wherein the binder contains about:

(a) 50–80% by weight, based on the weight of the binder, of an acrylic polymer comprising:
(i) at least one exomethylene lactone or lactam monomer of the structure:

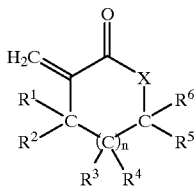

where X=O or N—R$^7$, n=0, 1 or 2 and R$^1$, R$^2$, R$^3$, R$^4$, R$^5$, R$^6$, R$^7$ are independently selected from the group (I) consisting of H, —CH(O), —CN and halogen, and from the group (II) consisting of —C(O)OR$^9$, —C(O)NR$^{10}$R$^{11}$, —CR$^{12}$(O), —C(O)OC(O)R$^{13}$, —C(O)NR$^{14}$COR$^{15}$, —OC(O)R$^{16}$, —OR$^{17}$, —NR$^{18}$R$^{19}$ alkyl, substituted alkyl, aryl and substituted aryl; wherein when R$^1$, R$^2$, R$^3$, R$^4$, R$^5$, R$^6$, R$^7$ are selected from group (II), they may optionally form a cyclic structure with one another; R$^9$, R$^{10}$, R$^{11}$, R$^{12}$, R$^{13}$, R$^{14}$, R$^{15}$, R$^{16}$, R$^{18}$ and R$^{19}$ are H, alkyl, aryl, substituted alkyl or substituted aryl; R$^{17}$ is alkyl, aryl, substituted alkyl or substituted aryl; and wherein the alkyl and substituted alkyl are C$_1$-C$_{12}$;

(ii) at least one methacrylate monomer selected from the group consisting of methyl methacrylate, isobornyl methacrylate, cyclohexyl methacrylate, n-butyl methacrylate, isobutyl methacrylate, ethyl hexyl methacrylate and mixtures thereof; and (iii) at least one hydroxy alkylmethacrylate or acrylate monomer each having 1–4 carbon atoms in the alkyl group wherein the polymer has a number average molecular weight of about 1,000–100,000 determined by gel permeation chromatography; and (b) 1–20% by weight, based on the weight of the binder, of a polyol component; and (c) 10–49% by weight, based on the weight of the binder, of a crosslinking agent selected from the group consisting of an organic polyisocyanate, a melamine formaldehyde resin, and a silane or mixtures thereof.

In a preferred embodiment the invention provides that the at least one exomethylene lactone or lactam monomer is an α-methylene-γ-butyrolactone monomer of the structure:

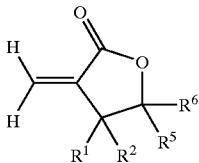

wherein R$^1$, R$^2$, R$^5$ and R$^6$ are each independently selected from the group (I) consisting of H, —CH(O), —CN and halogen, and from the group (II) consisting of —C(O)OR$^9$, —C(O)NR$^{10}$, R$^{11}$, —CR$^{12}$(O), —C(O)OC(O)R$^{13}$, —C(O)NR$^{14}$COR$^{15}$, —OC(O)R$^{16}$, —OR$^{17}$, —NR$^{18}$R$^{19}$ alkyl, substituted alkyl, aryl and substituted aryl; wherein when R$^1$ and R$^2$ are selected from group (II), R$^1$ and R$^2$ may optionally form a cyclic structure; R$^9$, R$^{10}$, R$^{11}$, R$^{12}$, R$^{13}$, R$^{14}$, R$^{15}$, R$^{16}$, R$^{18}$ and R$^{19}$ are H, alkyl, aryl, substituted alkyl or substituted aryl; R$^{17}$ is alkyl, aryl, substituted alkyl or substituted aryl; and wherein the alkyl and substituted alkyl are C$_1$-C$_{12}$.

The coating composition of this invention is solvent based and has a binder solids content of about 30–70% by weight and preferably, for a low VOC composition the binder content is at least 43% by weight. The binder contains about 50–80% by weight of the acrylic polymer, 1–20% by weight of the polyol component and about 10–49% by weight of a curing or crosslinking agent.

The coatings of the present invention are preferably low VOC coating compositions. "Low VOC coating compositions" means a coating composition that includes less then 0.6 kilograms of organic solvent per liter (5 pounds per gallon) of the composition, as determined under the procedure provided in ASTM D3960. It is also preferred that the coatings of the present invention are a high solids composition. "High solid composition" means a coating composition having solid component of above 40 percent, preferably in the range of from 45 to 85 percent and more preferably in the range of from 50 to 65 percent, all in weight percentages based on the total weight of a polymer composition.

The acrylic polymer used in the coating composition is prepared by conventional solution polymerization techniques in which monomers, solvents and polymerization catalyst are charged into a conventional polymerization reactor and heated to about 60–160° C. for about 0.5–6 hours to form a polymer having number average molecular weight of about 1,000–100,000, preferably 2,000–30,000, most preferably 3,000–10,000 and a weight average molecular weight of about 4,000–25,000.

Molecular weight is determined by gel permeation chromatography using polymethyl methacrylate or polystyrene as the standard.

The calculated glass transition temperature (Tg) of the acrylic polymer may vary however a typical value is a Tg of at least 40° C. and preferably 60–80° C. The glass transition temperature is calculated by the equation:

$$1/TGC = \Sigma_i W_i/TGH_i$$

wherein TGC is the glass transition temperature of the polymer in degrees Kelvin; $W_i$ is the weight fraction of monomer i in the polymer; $TGH_i$ is the glass transition temperature of the homopolymer in degrees Kelvin of monomer i which can be found for example in a source book such as the *Polymer Handbook* (1998), J. Brandrup and E. H. Immergut published by John Wiley & Sons.

The above equation is discussed on page 29 in *The Chemistry of Organic Film Formers*, (1977), 2$^{nd}$ edition, D. H. Solomon, published by Robert E. Krieger Publishing Co.

The glass transition temperature also can be measured by differential scanning calorimetry.

Typically useful polymerization catalysts include conventional free radical initiators, such as azo-initiators, for example azo-bis-isobutyronitrile and 1,1'-azo-bis (cyanocyclohexane), hydrogen peroxide, benzoyl peroxide, t-butyl hydroperoxide, di-t-butyl peroxide, t-butyl peroctoate, t-butyl peracetate, t-butyl perbenzoate, ammonium or alkali persulfates and combinations thereof. Preferably the initiator is used in a concentration typically of 0.05% to 3.0% by weight, based on the weight of the polymer composition. Initiation may be enhanced by the use of external sources such as heat, ultraviolet light, electron beam or other sources known by one skilled in the art.

Typical solvents that can be used are ketones such as methyl amyl ketone, methyl isobutyl ketone, methyl ethyl ketone, aromatic hydrocarbons such as toluene, xylene, alkylene carbonates such as propylene carbonate, n-methyl pyrrolidone, ethers, ester, acetates and mixtures of any of the above.

The acrylic polymer is composed of polymerized monomers of styrene, a substituted or unsubstituted α-methylene- γ-butyrolactone and a first methacrylate which is either methyl methacrylate, isobornyl methacrylate, cyclohexyl methacrylate or a mixture of these monomers, a second methacrylate monomer which is methyl methacrylate, isobornyl methacrylate, cyclohexyl methacrylate, n-butyl methacrylate, isobutyl methacrylate or ethyl hexyl methacrylate and mixtures thereof, and a hydroxy alkyl methacrylate or acrylate that has 1–4 carbon atoms in the alkyl group such as hydroxy ethyl methacrylate, hydroxy propyl methacrylate, hydroxy butyl methacrylate, hydroxy ethyl acrylate, hydroxy propyl acrylate, hydroxy butyl acrylate and the like.

One preferred polymer contains about 0–35% by weight styrene, 8–35% by weight of α-methylene-γ-butyrolactone, 30–60% by weight of one or more methacrylates or acrylates and 10–35% by weight of the hydroxy alkyl methacrylate, wherein the percentages of all components equals 100%.

Another preferred acrylic polymer contains about 0–25% by weight styrene, 10–35% by weight of α-methylene-γ-butyrolactone, 30–60% by weight of isobutyl methacrylate in combination with butyl acrylate and 10–30% by weight hydroxy propyl methacrylate, wherein the percentages of all components equals 100%.

Another particularly preferred acrylic polymer contains about 0–35% by weight styrene, 10–30% by weight of a-methylene-γ-butyrolactone, 20–60% by weight of isobornyl methacrylate, in combination with butyl acrylate and 10–35% by weight hydroxy ethyl methacrylate, wherein the percentages of all components equals 100%.

The polyol component used in the composition of the present invention is preferably of the formula of a polyol component of the formula $$Q[R^1O(COCH_2CH_2CH_2CH_2O)_n]_mH$$

wherein:
$R^1$ is a covalent bond or alkylene containing 1, 2, 3 or 4 carbon atoms;
n is about 1 to about 4;
m is 2, 3 or 4; and
Q is a saturated carbocyclic ring containing 5 or 6 carbon atoms, or S—$R^2$—T wherein S and T are each independently saturated carbocyclic rings containing 5 or 6 carbon atoms, and $R^2$ is a covalent bond or an alkylene group containing 1, 2, 3 or 4 carbon atoms; provided that no more than one $R^1$ is bound to any carbocyclic carbon atom, and further provided that when Q is S—$R^2$—T, each $R^1$ is bound to a carbon atom of the carbocyclic rings of S and T.

This polyol component comprises a caprolactone oligomer which has hydroxyl groups, and may be made by initiating caprolactone polymerization with a cyclic polyol. It is known in the art that alcohols (along with certain catalysts), including cyclic alcohols, may be used to initiate the polymerization of caprolactone according to the overall equation:

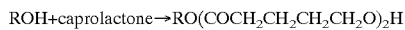
ROH+caprolactone→RO(COCH$_2$CH$_2$CH$_2$CH$_2$O)$_z$H

Generally the average degree of polymerization, z, will be the original molar ratio of caprolactone to ROH (or total hydroxyl groups present if ROH were a polyol), assuming the reaction was carried to completion. It is realized by those skilled in the art the product caprolactone oligomer or polymer will have a distribution of degrees of polymerization, z, and that z represents an arithmetic average of that distribution. A general reference for the polymerization of caprolactone is D. B. Johns et al., in K. J. Ivan and T. Saegusa, Ed., Elsevier Applied Science Publishers, Barking, Essex, England, 1984, p. 461–521, which is hereby incorporated by reference.

The component used in the coating composition has the formula

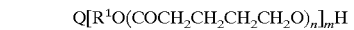
Q[R$^1$O(COCH$_2$CH$_2$CH$_2$CH$_2$O)$_n$]$_m$H wherein Q, $R^1$, n and m are as defined above. Thus n, is the average degree of polymerization of each caprolactone chain corresponds to z above. It is preferred that n is from about 1 to about 2. The symbol m represents the functionality (number of hydroxyl groups) of the polyol component, and is preferably 2. $R^1$ is a covalent bond or alkylene group that connects the caprolactone chain to the group Q, Q being a carbocyclic ring or the grouping S—$R^2$—T, which also has carbocyclic rings. It is preferred that $R^1$ is a covalent bond or methylene (CH$_2$).

When Q is a carbocyclic ring, preferably it is cyclohexylene, more preferably 1,4-cyclohexylene. When Q is S—$R^2$—T it is preferred if $R^2$ is 2,2-propylene or methylene. It is also preferred if both S and T are each cyclohexylene, and more preferred if both S and T are 1,4-cyclohexylene. As stated above, any $R^1$ must be bound to a carbocyclic ring carbon atom (Q, S or T) and no more than one $R^1$ may be bound to any carbocyclic ring carbon atom.

One skilled in the art will understand that to obtain the polyol component wherein Q is 1,4-cyclohexylene, $R^1$ is a covalent bond, n is two and m is two, one would react one mole of 1,4-cyclohexanediol with 4 moles of caprolactone. Similarly, to obtain the polyol component where Q is 1,4-cyclohexylene, $R^1$ is methylene, n is one and m is two, one would react one mole of 1,4-cyclohexane-dimethanol with two moles of caprolactone; to obtain the polyol component where Q is S—$R^2$—T and S and T are 1,4-cyclohexylene, $R^2$ is 2,2-propylene, $R^1$ is a covalent bond, n is 2.5 and m is 2, one would react one mole of 2,2-bis(4-hydroxycyclohexyl) propane with 5 moles of caprolactone.

Preferred polyol components are formed from ε-caprolactone and 1,4-cyclohexane dimethanol reacted in a molar ratio of 2/1 to 3/1.

The coating composition also contains an organic polyisocyanate crosslinking or curing agent. Any of the conventional aromatic, aliphatic, cycloaliphatic, isocyanates, trifunctional isocyanates and isocyanate functional adducts of a polyol and a diisocyanate can be used. Particularly suitable are organic polyisocyanate comprising an aliphatic polyisocyanate having an average of 2 to 6 isocyanate functionalities. Typically useful diisocyanates include but are not limited to the biuret of hexamethylene diisocyanate, the isocyanurate of hexamethylene diisocyanate, the biuret of isophorone diisocyanate, isophorone diisocyanate, 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, 4,4'-diisocyanatodiphenyl ether and the like.

Typical trifunctional isocyanates that can be used are triphenylmethane triisocyanate, 1,3,5-benzene triisocyanate, 2,4,6-toluene triisocyanate and the like. Trimers of diisocyanates also can be used such as the trimer of hexamethylene diisocyanate which is sold under the tradename "Desmodur" N-3390.

Isocyanate functional adducts can be used that are formed from an organic polyisocyanate and a polyol. Any of the

aforementioned polyisocyanates can be used with a polyol to form an adduct. Polyols such as trimethylol alkanes like trimethylol propane or ethane can be used. One useful adduct is the reaction product of tetramethylxylidene diisocyanate and trimethylol propane and is sold under the tradename "Cythane" 3160 (Cas. Reg. No. 94857-19-9).

Optionally, melamines, particularly melamine formaldehyde resins may be used as curing or crosslinking agents. Examples of suitable melamines are given in Uminski et al., *Surf Coat. Int.* (1995), 78(6), 244–9 and Jones et al., *Prog. Org. Coat.* (1994), 24(1–4), 189–208, both hereby incorporated by reference.

Similarly silane derivatives may also be used as curing or crosslinking agents in the present polymer. Suitable silanes are well known in the art and are disclosed in Johnson et al., (WO 9919411), hereby incorporated by reference.

To improve weatherability of the clear composition about 0.1–10% by weight, based on the weight of the binder, of ultraviolet light stabilizers screeners, quenchers and antioxidants can be added. Typical ultraviolet light screeners and stabilizers include the following: Benzophenones such as hydroxy dodecycloxy benzophenone, 2,4-dihydroxy benzophenone, hydroxy benzophenones containing sulfonic acid groups and the like. Benzoates such as dibenzoate of diphenylol propane, tertiary butyl benzoate of diphenylol propane and the like. Triazines such as 3,5-dialkyl-4-hydroxyphenyl derivatives of triazine, sulfur containing derivatives of dialkyl-4-hydroxy phenyl triazine, hydroxy phenyl-1,3,5-triazine and the like. Triazoles such as 2-phenyl-4-(2,2'-dihydroxy benzoyl)-triazole, substituted benzotriazoles such as hydroxy-phenyltriazole and the like. Hindered amines such as bis(1,2,2,6,6-pentamethyl-4-piperidinyl sebacate), di[4(2,2,6,6-tetramethyl piperidinyl)] sebacate and the like and any mixtures of any of the above.

The coating composition contains a sufficient amount of a catalyst to cure the composition at ambient temperatures. Generally, about 0.01–2% by weight, based on the weight of the binder, of catalyst is used. Typically useful catalysts are triethylene diamine and alkyl tin laurates such as dibutyl tin dilaurate, dibutyl tin diacetate, tertiary amines and the like. Preferred is a mixture of triethylene diamine and dibutyl tin dilaurate.

A coating composition containing the polymer prepared by the process of the present invention may also contain conventional additives, such as, reactive diluents, pigments, stabilizers, flow agents, toughening agents, fillers, durability agents, corrosion and oxidation inhibitors, rheology control agents, metallic flakes and other additives. Such additional additives will, of course, depend on the intended use of the coating composition. Fillers, pigments, and other additives that would adversely effect the clarity of the cured coating will not be included if the composition is intended as a clear coating.

Generally, flow control agents are used in the composition in amounts of about 0.1–5% by weight, based on the weight of the binder, such as polyacrylic acid, polyalkylacrylates, polyether modified dimethyl polysiloxane copolymer and polyester modified polydimethyl siloxane.

When used as a clear coating, it may be desirable to use pigments in the coating composition which have the same refractive index as the dried coating. Typically, useful pigments have a particle size of about 0.015–50 microns and are used in a pigment to binder weight ratio of about 1:100 to 10:100 and are inorganic siliceous pigments such as silica pigment having a refractive index of about 1.4–1.6.

The coating composition of this invention can be used to paint or repair a variety of substrates such as previously painted metal substrates, cold roll steel, steel coated with conventional primers such as electrodeposition primers, alkyd resin repair primers and the like, plastic type substrates such as polyester reinforced fiber glass, reaction injection molded urethanes and partially crystalline polyamides.

EXAMPLES

The present invention is further defined in the following Examples, in which all parts and percentages are by weight and degrees are Celsius, unless otherwise stated. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usage and conditions.

Common reagents were purchased from Sigma-Aldrich and solvents from VWR Scientific.

The meaning of abbreviations is as follows: "$\mu L$" means microliter, "mL" means milliliter(s), "L" means liter(s), "mM" means millimolar, "M" means molar, "mmol" means millimole(s) and "ng" means nanogram(s).

The following chemicals and polymer components are identified as follows:

| | |
|---|---|
| AC-100 | a commercial blend of aromatic solvents, bp approx 100° C. (ExxonMobil Co. Inc) |
| VAZO ® 67 | Free Radical Initiator, (DuPont, Wilmington, DE) |
| IBMA | isobutyl methyl methacrylate |
| IBOMA | Isobornyl methacrylate |
| BA | butyl acrylate |
| HPA | hydroxy propyl acrylate |
| A-174 | γ-methacryloxypropyl trimethoxysilane |
| MBL | α-methylene-γ-butyrolactone |

"DOI" will mean distinctness of image as discussed and calculated in U.S. Pat. No. 5,605,965.

"Crockmeter mar" refers to a measure of mar resistance as described in Ryntz et al., *Proc. Int. Waterborne, High-Solids, Powder Coat. Symp.* (1999), 26$^{th}$, 474–485.

"Tukon hardness" is a measure polymer hardness as discussed and measured in EP 553701.

Example 1

α-methylene-γ-butyrolactone Replacing Styrene in a Coating Composition

Example 1 illustrates how a α-methylene-γ-butyrolactone monomer may be used to partially or complete replace the styrene component in a coating composition resulting in enhanced mar and scratch resistance of the coating.

A series of acrylic polymer solutions, containing 0% (control), 8.33%, 16.66%, 25.0% and 33.3% of α-methylene-γ-butyrolactone were prepared. The specific procedure for the 8.33% α-methylene-γ-butyrolactone sample (sample F-2) follows.

| Ingredient | Parts by weight (g) |
|---|---|
| Portion 1 | |
| AC-100 | 167.79 |
| n-butanol | 135.29 |
| Portion 2 | |
| AC-100 | 140.76 |
| Vazo ® 67 | 78.11 |
| Styrene | 184.01 |
| IBMA | 276.02 |
| BA | 55.16 |
| HPA | 165.49 |
| A-174 | 330.98 |
| MBL | 92.00 |
| Portion 3 | |
| AC-100 | 17.60 |
| Vazo ® 67 | 9.76 |
| Rinse for Portion 2 | |
| AC-100 | 10.48 |
| Rinse for portion 3 | |
| n-butanol | 10.48 |

Portion 1 was added to a 2 liter polymerization reactor equipped with a thermometer, heating source, stirrer, dropping funnel, nitrogen purge and condenser and heated to its reflux temperature. Portion 2 was premixed and then added at a uniform rate to the reactor over a four hour period while the resulting reaction mixture was maintained at its reflux temperature. Portion 3 was added to the reactor over a 30 minute period at a uniform rate while maintaining the reaction mixture at its reflux temperature. The reaction mixture was held at its reflux temperature for an additional 2 hour period, then cooled.

Using the same procedures, acrylic polymer solution (samples F-1 to F-5) of the following monomer compositions in parts by weight (g) were prepared:

| Sample | MBL | Styrene | IBMA | BA | HPA | A-174 |
|---|---|---|---|---|---|---|
| F-1 (control) | 0 | 276.02 | 276.02 | 55.16 | 165.49 | 330.98 |
| F-2 (above) | 92.00 | 184.01 | 276.02 | 55.16 | 165.49 | 330.98 |
| F-3 | 184.01 | 92.0 | 276.02 | 55.16 | 165.49 | 330.98 |
| F-4 | 276.02 | 0.00 | 276.02 | 55.16 | 165.49 | 330.98 |
| F-5 | 368.02 | 0.00 | 184.01 | 55.16 | 165.49 | 330.98 |

The above corresponded to percent monomer compositions as follows:

| Sample | MBL | Styrene | IBMA | BA | HPA | A-174 |
|---|---|---|---|---|---|---|
| F-1 (control) | 0% | 25.0% | 25.0% | 5% | 15% | 30% |
| F-2 (above) | 8.33% | 16.66% | 25.0% | 5% | 15% | 30% |
| F-3 | 16.66% | 8.33% | 25.0% | 5% | 15% | 30% |
| F-4 | 25.0% | 0.00% | 25.0% | 5% | 15% | 30% |
| F-5 | 33.33% | 0.00% | 16.66% | 5% | 15% | 30% |

Properties of the acrylic polymer solution were as follows:

| Sample | % MBL | Wt % solids | $T_g$(° C.) | PDI | Mw | Mn |
|---|---|---|---|---|---|---|
| F-1 (control) | 0% | 70.24 | 3.71 | 3.01 | 7485 | 2486 |
| F-2 (above) | 8.33% | 71.57 | 0.66 | 2.96 | 7905 | 2667 |
| F-3 | 16.66% | 69.66 | 15.51 | 3.86 | 7255 | 1872 |
| F-4 | 25.0% | 72.35 | 13.02 | 2.98 | 7583 | 2540 |
| F-5 | 33.33% | 72.44 | 26.39 | 3.59 | 7746 | 2155 |

The above polymer solutions were used in the preparation of clearcoat formulations according to the methods disclosed in U.S. Pat. No. 5,244,696, which is hereby incorporated by reference. These clearcoat formulations (coded P-1 to P-5, prepared from above polymer solutions F-1 to F-5, respectively) were sprayed onto a previously coated metal substrate. The panels were baked for 30 minutes at 285° F.

Properties of these clearcoat formulations are tabulated below.

| Sample | % MBL | % Non-Volatile | VOC | 20 deg gloss | DOI | Tukon hardness | Crock Mar % gloss retention | Etch |
|---|---|---|---|---|---|---|---|---|
| P-1 (control) | 0 | 51.5 | 4.04 | 85.0 | 91.0 | 7.5 | 26.0 | control |
| P-2 | 8.33 | 50.8 | 3.99 | 84.0 | 87.5 | 8.6 | 31.0 | equiv |
| P-3 | 16.66 | 50.2 | 4.03 | 84.0 | 87.8 | 8.0 | 76.0 | equiv |
| P-4 | 25.0 | 47.9 | 4.27 | 45.0 | 35.0 | 10.0 | 67.0 | equiv |
| P-5 | 33.33 | 44.0 | 4.54 | 1.3 | 1.1 | 8.9 | 29.0 | equiv |

Example 2

α-methylene-γ-butyrolactone Replacing Isobornyl Methacrylate in a Coating Composition Example 2 illustrates how a α-methylene-γ-butyrolactone monomer may be used to partially or complete replace the isobornyl methacrylate component in a coating composition resulting in enhanced mar and scratch resistance of the coating.

A series of acrylic polymer solutions, containing 0% (control), 10% and 20% of α-methylene-γ-butyrolactone were prepared. Accordingly the samples contained 0%, 3.3%, and 6.6% MBL vs IBOMA monomer content. The specific procedure for the 10% α-methylene-γ-butyrolactone sample (sample F-7) follows.

| Ingredient | Parts by weight (g) |
|---|---|
| Portion 1 | |
| Xylene | 56.67 |
| Portion 2 | |
| Styrene | 35.0 |
| MBL | 10.0 |
| Isobornyl methacrylate | 10.0 |
| BA | 10.0 |
| hydroxyethylmethacrylate | 35.0 |
| t-butyl peracetate | |
| (75% solids in mineral spirits) | 2.40 |
| Portion 3 | |
| t-butyl peracetate | |
| (75% solids in mineral spirits) | 0.6 |
| methyl ethyl ketone | 10.0 |

Portion 1 was added to a polymerization reactor equipped with a thermometer, heating source, stirrer, dropping funnel, nitrogen purge and condenser and heated to its reflux temperature. Portion 2 was premixed and then added at a uniform rate to the reactor over a three hour period while the resulting reaction mixture was maintained at its reflux temperature. Portion 3 was added to the reactor over a 1 hour period at a uniform rate while maintaining the reaction mixture at its reflux temperature. The reaction mixture was held at its reflux temperature for an additional 1 hour period, then cooled.

Using the same procedures, acrylic polymer solution (samples F-6 to F-8) of the following monomer compositions were prepared:

| Sample | styrene | MBL | Isobornyl methacrylate | BA | hydroxyethyl methacrylate |
|---|---|---|---|---|---|
| F-6 (control) | 35.0 | 0 | 20.0 | 10 | 35 |
| F-7 (above) | 35.0 | 10.0 | 10.0 | 10 | 35 |
| F-8 | 35.0 | 20.0 | 0 | 10 | 35 |

Properties of the acrylic polymer solution were as follows:

| Sample | % MBL | Wt % solids | visc cps | $T_g$ (° C.) | PDI | Mw | Mn |
|---|---|---|---|---|---|---|---|
| F-6 | 0 | 70.23 | 36800 | 62.1 | 2.2 | 5686 | 2582 |
| F-7 | 10 | 69.28 | 126000 | 68.2 | 1.74 | 5097 | 2929 |
| F-8 | 20 | 69.37 | semi solid | 74.2 | 1.98 | 5469 | 2762 |

The above polymer solutions were used in the preparation of clearcoat formulations according to the methods disclosed in U.S. Pat. No. 5,244,696, which is hereby incorporated by reference. These clearcoat formulations (coded P-6 to P-8, prepared from above polymer solutions F-6 to F-8, respectively) were sprayed onto a previously coated metal substrate. The panels were baked for 30 minutes at 285° F. Properties of these clearcoat formulations are tabulated below.

| Sample | Polymer % MBL | Visual Appearance | Crockmeter mar dry % | wet % | Gradient Etch (DSR combined rating) |
|---|---|---|---|---|---|
| P-6 (Control) | 0 | 6 | 78 | 59.2 | 21 |
| P-7 | 10.0 | 6 | 79.1 | 59.8 | 18 |
| P-8 | 20.0 | 6 | 76.8 | 68.3 | 19 |

As can be seen by the data above when comparing P-7 and P-8 with P-6 (Control) the wet mar percent improves with increased concentration of MBL. Additionally, the gradient etch data indicates that polymer containing MBL compares favorably with that having only IBOMA.

What is claimed is:

1. A coating composition comprising:
   (a) a polymer having a number average molecular weight of about 30,000 or below comprising at least one exomethylene lactone or lactam monomer of the structure:

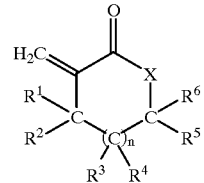

where X═O or N—$R^7$, n=0, 1 or 2 and $R^1$, $R^2$, $R^3$, $R^4$, $R^5$, $R^6$, $R^7$ are independently selected from the group (I) consisting of H, —CH(O), —CN and halogen, and from the group (II) consisting of —C(O)$OR^9$, —C(O)$NR^{10}R^{11}$, —$CR^{12}$(O), —C(O)OC(O)$R^{13}$, —C(O)$NR^{14}COR^{15}$, —OC(O)$R^{16}$, —$OR^{17}$, —$NR^{18}R^{19}$ alkyl, substituted alkyl, aryl and substituted aryl; wherein when $R^1$, $R^2$, $R^3$, $R^4$, $R^5$, $R^6$, $R^7$ are selected from group (II), they may optionally form a cyclic structure with one another; $R^9$, $R^{10}$, $R^{11}$, $R^{12}$, $R^{13}$, $R^{14}$, $R^{15}$, $R^{16}$, $R^{17}$, $R^{18}$ and $R^{19}$ are H, alkyl, aryl, substituted alkyl or substituted aryl; $R^{17}$ is alkyl, aryl, substituted alkyl or substituted aryl; and wherein the alkyl and substituted alkyl are $C_1$–$C_{12}$; and
   (b) at least one other compolymerizable monomer.

2. A coating composition according to claim 1 wherein the at least one exomethylene lactone or lactam monomer of step (a) is an α-methylene-γ-butyrolactone monomer of the structure

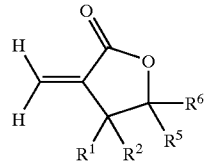

wherein $R^1$, $R^2$, $R^5$ and $R^6$ are each independently selected from the group (I) consisting of H, —CH(O), —CN and halogen, and from the group (II) consisting of —C(O)$OR^9$, —C(O)$NR^{10}R^{11}$, —$CR^{12}$(O), —C(O)OC(O)$R^{13}$, —C(O)$NR^{14}COR^{15}$, —OC(O)$R^{16}$, —$OR^{17}$, —$NR^{18}R^{19}$ alkyl, substituted alkyl, aryl and substituted aryl; wherein when $R^1$ and $R^2$ are selected from group (II), $R^1$ and $R^2$ may optionally form a cyclic structure; $R^9$, $R^{10}$, $R^{11}$, $R^{12}$, $R^{13}$, R¹⁴, R¹⁵, R¹⁶, R¹⁸ and R¹⁹ are H, alkyl, aryl, substituted alkyl or substituted aryl; R¹⁷ is alkyl, aryl, substituted alkyl or substituted aryl; and wherein the alkyl and substituted alkyl are $C_1-C_{12}$.

3. The coating composition of claim 2 wherein the at least one exomethylene lactone or lactam monomer is unsubstituted α-methylene-γ-butyrolactone.

4. A coating composition according to claim 1 wherein said at least one other copolymerizable monomer of step (b) is a methacrylate monomer.

5. A coating composition according to claim 4 wherein said methacrylate monomer is selected from the group consisting of: methyl methacrylate, isobornyl methacrylate, cyclohexyl methacrylate, n-butyl methacrylate, isobutyl methacrylate, ethyl hexyl methacrylate and mixtures thereof, and a hydroxy alkylmethacrylate or acrylate each having 1–4 carbon atoms in the alkyl group wherein the polymer has a number average molecular weight of about 2,000 to about 30,000 determined by gel permeation chromotography.

6. A coating composition according to claim 5 wherein the polymer has a number average molecular weight of about 3,000 to about 10,000.

7. An acrylic polymer comprising:
(a) substituted or unsubstituted exomethylene lactone or lactam;
(b) a first methacrylate monomer;
(c) a second methacrylate monomer; and
(d) a hydroxy alkyl methacrylate or acrylate monomer having 1–4 carbon atoms in the alkyl group, wherein the polymer has a number average molecular weight of about 30,000 or below.

8. An acrylic polymer of claim 7 optionally comprising polymerized monomers of styrene.

9. The acrylic polymer of claim 7 or 8 wherein the exomethylene lactone or lactam of step (b) has the structure:

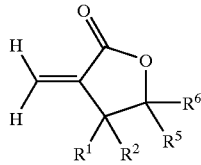

wherein R¹, R², R⁵ and R⁶ are each independently selected from the group (I) consisting of H, —CH(O), —CN and halogen, and from the group (II) consisting of —C(O)OR⁹, —C(O)NR¹⁰R¹¹, —CR¹²(O), —C(O)OC(O)R¹³, —C(O)NR¹⁴COR¹⁵, —OC(O)R¹⁶, —OR¹⁷, —NR¹⁸R¹⁹ alkyl, substituted alkyl, aryl and substituted aryl; wherein when R¹ and R² are selected from group (II), R¹ and R² may optionally form a cyclic structure; R⁹, R¹⁰, R¹¹, R¹², R¹³, R¹⁴, R¹⁵, R¹⁶, R¹⁸ and R¹⁹ are H, alkyl, aryl, substituted alkyl or substituted aryl; R¹⁷ is alkyl, aryl, substituted alkyl or substituted aryl; and wherein the alkyl and substituted alkyl are $C_1-C_{12}$.

10. The acrylic polymer of claim 7 or 8 wherein the first methacrylate monomer is selected from the group consisting of methyl methacrylate, isobornyl methacrylate, cyclohexyl methacrylate and mixtures thereof.

11. The acrylic polymer of claim 7 or 8 wherein the second methacrylate monomer is selected from the group consisting of methacrylate, isobornyl methacrylate, cyclohexyl methacrylate, n-butyl methacrylate, isobutyl methacrylate, ethyl hexyl methacrylate and mixtures thereof.

12. The acrylic polymer of claim 7 or 8 wherein the hydroxy alkyl methacrylate or acrylate monomer is selected from the group consisting of hydroxy ethyl methacrylate, hydroxy propyl methacrylate, hydroxy butyl methacrylate, hydroxy ethyl acrylate, hydroxy propyl acrylate, hydroxy butyl acrylate and mixtures thereof.

13. The acrylic polymer of claim 8 containing about 0–35% by weight styrene, 8–35% by weight of α-methylene-γ-butyrolactone, 30–60% by weight of one or more methacrylates or acrylates and 10–35% by weight of the hydroxy alkyl methacrylate, wherein the percentages of all components equals 100%.

14. The acrylic polymer of claim 8 containing about 0–25% by weight styrene, 10–35% by weight of α-methylene-γ-butyrolactone, 30–60% by weight of isobutyl methacrylate in combination with butyl acrylate and 10–30% by weight hydroxy propyl methacrylate, wherein the percentages of all components equals 100%.

15. The acrylic polymer of claim 8 containing about 0–35% by weight styrene, 10–30% by weight of α-methylene-γ-butyrolactone, 20–60% by weight of isobornyl methacrylate, in combination with butyl acrylate and 10–35% by weight hydroxy ethyl methacrylate, wherein the percentages of all components equals 100%.

16. A coating composition having a film forming binder solids content of about 30–70% by weight and an organic liquid carrier, wherein the binder contains about:
(a) 50–80% by weight, based on the weight of the binder, of an acrylic polymer comprising:
(i) at least one exomethylene lactone or lactam monomer of the structure:

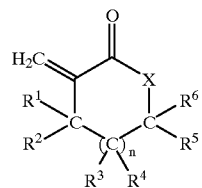

where X=O or N—R⁷, n=0, 1 or 2 and R¹, R², R³, R⁴, R⁵, R⁶, R⁷ are independently selected from the group (I) consisting of H, —CH(O), —CN and halogen, and from the group (II) consisting of —C(O)OR⁹, —C(O)NR¹⁰R¹¹, —CR¹²(O), —C(O)OC(O)R¹³, —C(O)NR¹⁴COR¹⁵, —OC(O)R¹⁶, —OR¹⁷, —NR¹⁸R¹⁹ alkyl, substituted alkyl, aryl and substituted aryl; wherein when R¹, R², R³, R⁴, R⁵, R⁶, R⁷ are selected from group (II), they may optionally form a cyclic structure with one another; R⁹, R¹⁰, R¹¹, R¹², R¹³, R¹⁴, R¹⁵, R¹⁶, R¹⁷, R¹⁸ and R¹⁹ are H, alkyl, aryl, substituted alkyl or substituted aryl; R¹⁷ is alkyl, aryl, substituted alkyl or substituted aryl; and wherein the alkyl and substituted alkyl are $C_1-C_{12}$;
(ii) at least one methacrylate monomer selected from the group consisting of methyl methacrylate, isobornyl methacrylate, cyclohexyl methacrylate, n-butyl methacrylate, isobutyl methacrylate, ethyl hexyl methacrylate and mixtures thereof; and
(iii) at least one hydroxy alkylmethacrylate or acrylate monomer each having 1–4 carbon atoms in the alkyl group wherein the polymer has a number average molecular weight of about 30,000 or below determined by gel permeation chromatography; and
(b) 1–20% by weight, based on the weight of the binder, of a polyol component; and
c) 10–49% by weight, based on the weight of the binder, of a crosslinking agent selected from the group consisting of an organic polyisocyanate, a melamine formaldehyde resin and a silane or mixtures thereof.

17. A coating composition of claim 16 wherein the polymer has a number average molecular weight of about 2,000–30,000 determined by gel permeation chromatography.

18. A coating composition of claim 16 wherein the polymer has a number average molecular weight of about 3,000–10,000 determined by gel permeation chromatography.

19. A coating composition of claim 16 wherein the polymer has a calculated Tg of at least 40° C.

20. A coating composition according to claim 16 wherein the at least one exomethylene lactone or lactam monomer of step (a)(i) is an α-methylene-γ-butyrolactone monomer of the structure

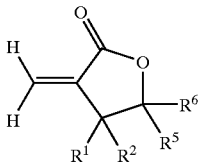

wherein $R^1$, $R^2$, $R^5$ and $R^6$ are each independently selected from the group (I) consisting of H, —CH(O), —CN and halogen, and from the group (II) consisting of —C(O)OR$^9$, —C(O)NR$^{10}$R$^{11}$, —CR$^{12}$(O), —C(O)OC(O)R$^{13}$, —C(O)NR$^{14}$COR$^{15}$, —OC(O)R$^{16}$, —OR$^{17}$, —NR$^{18}$R$^{19}$ alkyl, substituted alkyl, aryl and substituted aryl; wherein when $R^1$ and $R^2$ are selected from group (II), $R^1$ and $R^2$ may optionally form a cyclic structure; $R^9$, $R^{10}$, $R^{11}$, $R^{12}$, $R^{13}$, $R^{14}$ $R^{15}$, $R^{16}$, $R^{18}$ and $R^{19}$ are H, alkyl, aryl, substituted alkyl or substituted aryl; $R^{17}$ is alkyl, aryl, substituted alkyl or substituted aryl; and wherein the alkyl and substituted alkyl are $C_1$–$C_{12}$.

21. A coating composition according to claim 16 wherein the polyol component of step (b) has the structure:

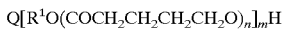

Q[R$^1$O(COCH$_2$CH$_2$CH$_2$CH$_2$O)$_n$]$_m$H wherein:
$R^1$ is a covalent bond or alkylene containing 1, 2, 3 or 4 carbon atoms;
n is about 1 to about 4;
m is 2, 3 or 4; and
Q is a saturated carbocyclic ring containing 5 or 6 carbon atoms, or S—R$^2$—T wherein S and T are each independently saturated carbocyclic rings containing 5 or 6 carbon atoms, and $R^2$ is a covalent bond or an alkylene group containing 1, 2, 3 or 4 carbon atoms;
provided that no more than one $R^1$ is bound to any carbocyclic carbon atom, and further provided that when Q is S—R$^2$—T, each $R^1$ is bound to a carbon atom of the carbocyclic rings of S and T.

22. A coating composition according to claim 16 wherein the crosslinking agent is an organic polyisocyanate comprising aliphatic polyisocyanate having an average of 2 to 6 isocyanate functionalities.

23. A coating composition according to claim 22 wherein the organic polyisocyanate is selected from the group consisting of aliphatic isocyanates, cycloaliphatic isocyanates aromatic isocyanates, trifunctional isocyanates and isocyanate functional adducts of a polyol and a diisocyanate.

24. A coating composition according to claim 23 wherein the organic polyisocyanate is selected from the group consisting of the biuret of hexamethylene diisocyanate, the isocyanurate of hexamethylene diisocyanate, the biuret of isophorone diisocyanate, and isophorone diisocyanate.

25. A coating composition of any of claims 16–19 additionally comprising polymerized monomers of styrene.

26. A coating composition of claim 2 or 20 wherein the α-methylene-γ-butyrolactone monomer is α-methylene-γ-butyrolactone.

27. A method for enhancing the mar resistance of a coating composition comprising an acrylic polymer, said polymer having at least one styrene monomer and at least one methacylate monomer comprising;
replacing all or a portion of said styrene monomer with an α-methylene-γ-butyrolactone monomer of the structure

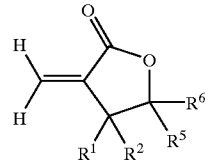

wherein $R^1$, $R^2$, $R^5$ and $R^6$ are each independently selected from the group (I) consisting of H, —CH(O), —CN and halogen, and from the group (II) consisting of —C(O)OR$^9$, —C(O)NR$^{10}$R$^{11}$, —CR$^{12}$(O), —C(O)OC(O)R$^{13}$, —C(O)NR$^{14}$COR$^{15}$, —OC(O)R$^{16}$, —OR$^{17}$, —NR$^{18}$R$^{19}$ alkyl, substituted alkyl, aryl and substituted aryl; wherein when $R^1$ and $R^2$ are selected from group (II), $R^1$ and $R^2$ may optionally form a cyclic structure; $R^9$, $R^{10}$, $R^{11}$, $R^{12}$, $R^{13}$, $R^{14}$, $R^{15}$, $R^{16}$, $R^{18}$ and $R^{19}$ are H, alkyl, aryl, substituted alkyl or substituted aryl; $R^{17}$ is alkyl, aryl, substituted alkyl or substituted aryl; and wherein the alkyl and substituted alkyl are $C_1$–$C_{12}$,
wherein said mar resistance of the coating composition is enhanced.

28. A method for enhancing the mar resistance of a coating composition comprising an acrylic polymer, said polymer having at least one styrene monomer and at least one methacrylate monomer comprising;
replacing all or a portion of said methacrylate monomer with an α-methylene-γ-butyrolactone monomer of the structure

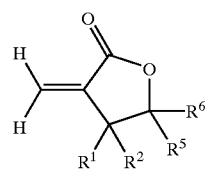

wherein $R^1$, $R^2$, $R^5$ and $R^6$ are each independently selected from the group (I) consisting of H, —CH(O), —CN and halogen, and from the group (II) consisting of —C(O)OR$^9$, —C(O)NR$^{10}$R$^{11}$, —CR$^{12}$(O), —C(O)OC(O)R$^{13}$, —C(O)NR$^{14}$COR$^{15}$, —OC(O)R$^{16}$, —OR$^{17}$, —NR$^{18}$R$^{19}$ alkyl, substituted alkyl, aryl and substituted aryl; wherein when $R^1$ and $R^2$ are selected from group (II), $R^1$ and $R^2$ may optionally form a cyclic structure; $R^9$, $R^{10}$, $R^{11}$, $R^{12}$, $R^{13}$, $R^{14}$, $R^{15}$, $R^{16}$, $R^{18}$ and $R^{19}$ are H, alkyl, aryl, substituted alkyl or substituted aryl; $R^{17}$ is alkyl, aryl, substituted alkyl or substituted aryl; and wherein the alkyl and substituted alkyl are $C_1$–$C_{12}$,
wherein said mar resistance of the coating composition is enhanced.

29. An article comprising a substrate selected from the group consisting of metal, plastic, wood, or rubber coated with the hardened coating composition of claim 16.

* * * * *